Figure 1:
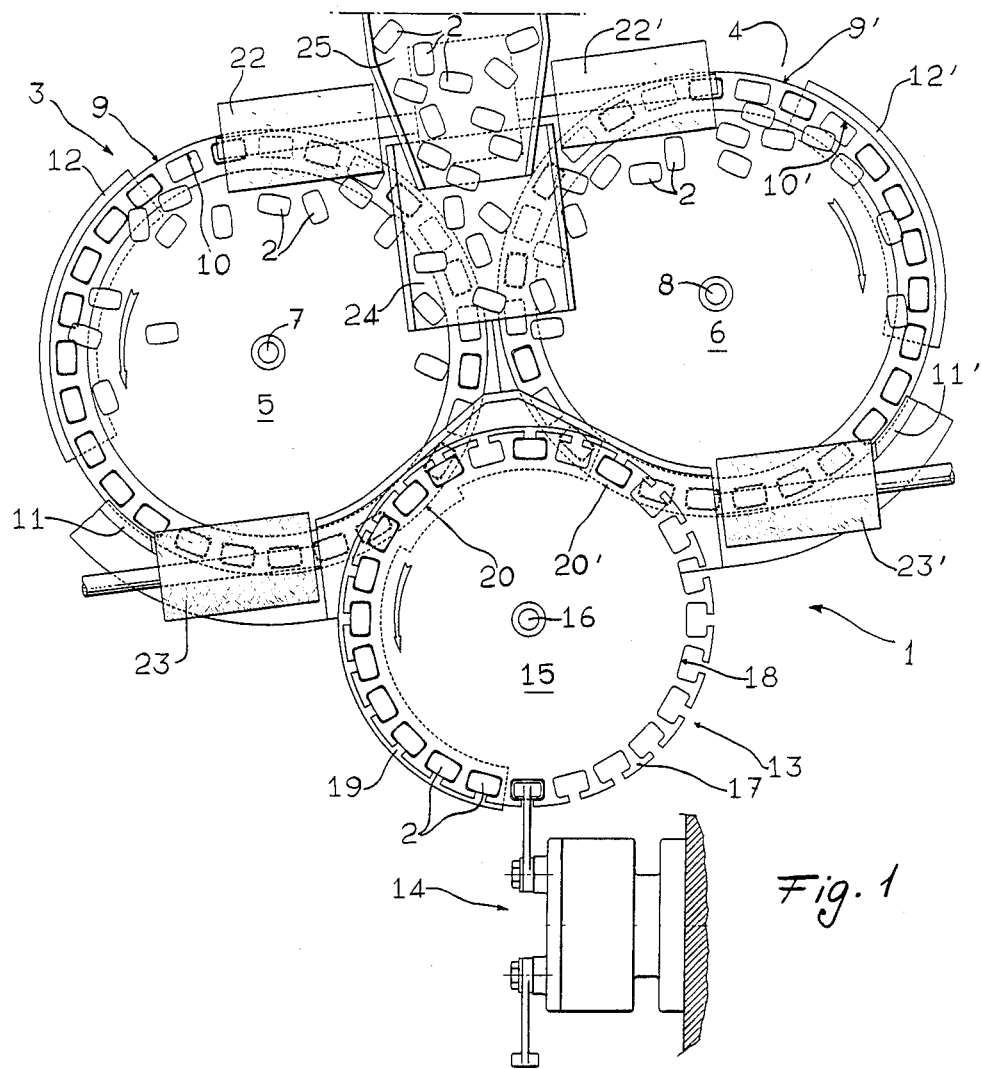

United States Patent [19]

Gamberini et al.

[11] Patent Number: 4,768,639
[45] Date of Patent: Sep. 6, 1988

[54] METHOD FOR TRANSFERRING OBJECTS, IN PARTICULAR SWEETS, WITHIN A WRAPPING MACHINE

[75] Inventors: Antonio Gamberini; Roberto Natali, both of Bologna, Italy

[73] Assignee: G.D. Societa per Azioni, Bologna, Italy

[21] Appl. No.: 29,743

[22] Filed: Mar. 24, 1987

[30] Foreign Application Priority Data

Apr. 16, 1986 [IT] Italy ................ 3392 A/86

[51] Int. Cl.⁴ ............................................. B65G 29/00
[52] U.S. Cl. ....................................... 198/392; 198/450; 198/468.2; 198/468.8; 53/225; 53/234; 221/112
[58] Field of Search ............... 198/468.8, 468.6, 468.2, 198/397, 392, 445, 447, 450, 608, 617; 221/95, 112, 114; 53/225, 234, 168

[56] References Cited

U.S. PATENT DOCUMENTS 2,995,234 8/1961 Seragnoli .................. 198/468.8
3,158,251 11/1964 Skala et al. .................. 198/450 X
3,601,242 8/1971 Reinemuth et al. ............ 198/580 X
3,912,123 10/1975 Seragnoli ..................... 221/237

FOREIGN PATENT DOCUMENTS 814369 6/1959 United Kingdom ................ 53/234
2036680 7/1980 United Kingdom ............ 198/468.6

Primary Examiner—Robert J. Spar
Assistant Examiner—Cheryl L. Gastineau
Attorney, Agent, or Firm—Ladas & Parry

[57] ABSTRACT

A method for transferring objects (2), wherein the objects (2) are fed in bulk in a loading region onto at least one first intermittently rotating disc (5; 6) of vertical axis, provided with a rim (9; 9') of holes (10; 10') for containing the objects (2); within a station (20; 20') there are provided members (21) which transfer the objects (2) from the holes (10; 10') of the first disc (5; 6) to the holes (18) of a second disc (15), and which engage each hole (10; 10') of the first disc (5; 6) once during every two revolutions of this latter.

5 Claims, 1 Drawing Sheet

U.S. Patent   Sep. 6, 1988   4,768,639

METHOD FOR TRANSFERRING OBJECTS, IN PARTICULAR SWEETS, WITHIN A WRAPPING MACHINE

The present invention relates to a method for transferring objects, in particular sweets, within a wrapping machine.

In wrapping machines for sweets and similar objects, as described for example in U.S. Pat. No. 3,912,123 of the present applicant G.D. S.p.A. it is known to use as the means for transferring such objects towards the wrapping line one or more substantially frusto-conical discs, known as distributor discs, which rotate with intermittent motion about vertical axes.

The objects, poured in bulk onto these discs, become inserted by gravity and by the effect of centrifugal force into equidistant holes with which the discs are peripherally provided.

As a result of the stepwise rotation of the distributor discs, these holes one after the other reach a transfer station in which the objects contained in them are inserted in succession into holes provided peripherally in a transporter disc, the purpose of which is to feed the objects one at a time to gripper means forming part of the wrapping line of the wrapping machine. It has however been found that on reaching the said transfer station not all the holes of said distributor discs contain an object.

This drawback is a serious obstacle to the attainment of high efficiency by the most modern wrapping machines for sweets or similar objects.

The object of the present invention is to provide a method for transferring objects, usable in wrapping machines of the aforesaid type, which enables the statistical probability of the objects entering said holes to be increased, so resulting in a more uniform feed of objects to the wrapping line than with known machines.

The present invention provides a method for transferring objects, in particular sweets, within a wrapping machine, wherein the objects are transferred, by means of at least one intermittently rotating disc of vertical axis provided with a rim of equidistant holes, from a loading region in which said objects are fed in bulk onto said disc, to a transfer station disposed along the periphery of said disc at a determined distance from said loading region, within said transfer station there being provided means for transferring said objects from said holes to the wrapping line of said machine, characterised in that in order to increase the statistical probability of said objects entering said holes, each said hole is engaged by said transfer means after passing at least twice through said loading station.

Figure 2:
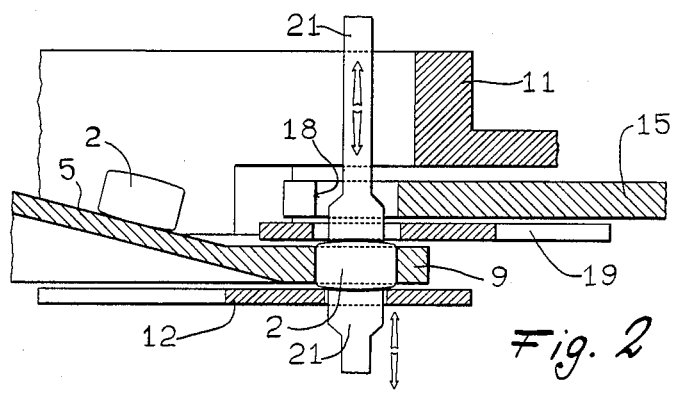

The present invention is described hereinafter by way of non-limiting example with reference to the accompanying drawings in which:

FIG. 1 is a diagrammatic plan view of a device for implementing the method according to the present invention; and FIG. 2 is a sectional view to an enlarged scale of a detail of the device of FIG. 1.

In FIG. 1, the reference numeral 1 indicates overall a feed device for objects 2, and forming part of a sweet wrapping machine, not shown.

The device 1 contains two distribution units 3 and 4, comprising respective discs 5 and 6, defined as distributor discs, the first rotating anticlockwise and the second rotating clockwise, and mounted on vertical shafts 7 and 8 driven with intermittent rotary motion by drive means, not shown.

As the units 3 and 4 are substantially identical, the description given hereinafter refers in particular to the unit 3, the component parts of the unit 4 being indicated by reference numerals equal to those relating to the unit 3 but distinguished by an apostrophe.

The outer edge of the disc 3 is formed by a rim 9 defined upperly by a horizontal plane and traversed by an odd number of equidistant holes 10 for containing the objects 2.

The disc 5 constitutes the mobile base of a receiver into which the objects 2 are fed in bulk, and is bounded laterally by an arched wall 11 supported in a manner not shown by the base of the wrapping machine.

Below the rim 9 of the disc 5, this base supports a fixed arched plate 12 forming a bottom for the holes 10. The reference numeral 13 indicates overall the means for transferring the objects 2 to a wrapping line 14, these comprising a flat disc 15 of vertical axis, defined as the transporter disc, which is supported and driven with intermittent rotary motion by a shaft 16 driven with anticlockwise rotation in a manner not shown. The disc 15 is provided peripherally with a rim 17 containing equidistant holes 18 analogous to the holes 10 and 10'. A fixed arched plate 19 forms a base element for the holes 18.

The rim 17 is superposed on the rims 9 and 9', to define respective stations 20 and 20' for transferring the objects 2 to the disc 15, these stations being disposed symmetrically about a vertical plane lying between the discs 5 and 6.

At the transfer stations 20 and 20', the rims 12, 12' and 17 are interrupted in such a manner as to allow passage of elevator transfer means 21 arranged to transfer the objects 2 from the holes 10, 10' of the discs 5 and 6 to the holes 18 of the disc 15.

Above those regions of the rims 9 and 9' which are disposed immediately upstream of the stations 20 and 20' with reference to the direction of rotation of the discs 5 and 6, there are mounted two substantially cylindrical brushes 22 and 22' tangential to the rims 9 and 9' and rotating with continuous motion about horizontal axes substantially normal to the shafts 7 and 8. Respective brushes 23 and 23' analogous to the preceding lie above the discs 5 and 6 in correspondence with those regions of the rims 9 and 9' positioned diametrically opposite the brushes 22 and 22'.

When in use, the objects 2 are poured from a vibrating tray 24, fed by a hopper 25, into the region of substantial tangency between the discs 5 and 6, defined hereinafter as the loading region, from which the objects 2 move towards the holes 10 and 10' under the effect of centrifugal force.

The purpose of the brushes 22, 22', 23 and 23' is to extract from the holes 10 and 10' the objects 2 which lie incorrectly, and to provide a stabilising action for the objects 2 occupying the holes 10 and 10' and an action of continuous agitation and distribution for the objects 2 falling from the vibrating tray The width of the rotation step through which the disc 5 (6) is driven is such that alternate holes 10 (10') halt in succession at the said station 20 (20'). During each stoppage of the discs 5 and 6, with which a stoppage of the disc 15 corresponds, the elevator means 21 extract a respective object 2 from a hole 10 and from a hole 10', and introduce these objects 2 into respective holes 18. More precisely, during successive stoppages of the discs 5, 6 and 15, the objects 2 originating from the holes 10' are inserted into alternate holes 18 of the disc 15, and the objects 2 originating from the holes 10 are inserted into the empty holes 18 lying between two holes 18 which have received objects 2 from the disc 6.

Successive rotation steps of the disc 15 move the objects 2 contained in the holes 18 to the wrapping line 14.

As stated, the holes 10 and 10' contained in the discs 5 and 6 are provided in an odd number; as a result of this, those holes 10 and 10' which do not halt in correspondence with the stations 20 and 20' during the course of a revolution undergone by the discs 5 and 6 halt one after the other in these stations during the next revolution undergone by the discs 5 and 6.

The embodiment of the device according to the invention shown in FIGS. 1 and 2 can be obviously modified without leaving the scope of the present invention. For example, the discs 5 and 6 can be made to rotate stepwise in such a manner as to cause all the holes 10 and 10' to halt in succession in the stations 20 and 20' during each revolution undergone by the discs 5 and 6. In this case, according to the present invention, the elevator means 21 effect one transfer operation every two rotation steps of the discs 5 and 6.

As seen, each hole 10, 10' passes twice through the region into which the objects 2 are bulk-fed before being engaged by the elevator means 21.

Even if the time for which each hole 10, 10' remains within the loading region is equal to that of feed devices of known type for equal frequency of operation of the elevator means 21, a considerable reduction in the number of empty holes 18 in the disc 15 per unit of time has been noted in practice.

This means that the probability of filling the holes 10, 10' of the discs 5, 6 is, within determined limits, independent of the time for which the holes 10, 10' remain within the loading region, and is considerably increased by double passage of the holes through this region.

This approach can be further generalised, in the sense that each hole 10, 10' can make three or four passages through the loading region before its engagement by the elevator means 21. If a unit step of the disc 5 or 6 is defined as its travel through an angle equal to the angle between two adjacent holes 10 or 10', the total number of holes in the disc 5 or 6 must not be a multiple of the number of unit steps undergone by the disc 5 or 6 between two successive operations of the elevator means 21. This condition must be satisfied in order for all the holes 10, 10' to be finally engaged by the elevator means 21 during the more than one revolution of the discs 5 and 6.

In the examples described heretofore, in which the number of unit steps undergone by the discs 5 and 6 between two successive operations of the elevator means 21 is equal to two, the said condition is satisfied if the discs 5 and 6 have an odd number of holes 10, 10'.

We claim:

1. A method for transferring objects in particular sweets within a wrapping machine, said method comprising the steps of:
   rotating a first disk through a feeding station, said first disk being intermittently rotated about a vertical axis defining symmetrically about its rim a plurality of equidistant openings for receiving objects dispensed in bulk at said feeding station;
   carrying said objects in said openings to a transfer station located along said periphery of said first disk;
   transferring by transferring means said objects from said openings in said first disk to a wrapping line in said wrapping machine, said transferring step occurring after said disk has passed through said feeding station at least twice.

2. The method of claim 1 wherein during said rotating step a unit step of said first disk is defined as the travel of said first disk through an angle equal to the angle defined by two adjacent openings, the number of openings in said first disk being unequal to a multiple of the number of unit steps undergone by said disk between two successive operations of said transferring step.

3. The method of claim 2 wherein there is an odd number of openings in said first disk such that during each intermittent step said disk travels through an angle which is double the angle defined by said unit step; and wherein in said transfer step said transfer means is operated during each stoppage of said disk.

4. The method of claim 2 wherein there is an odd number of openings in said first disk such that during each intermittent step said disk travels through an angle which is equal to the angle defined by said unit step; and wherein said transfer means are operated during alternate stoppages of said disk.

5. The method of claim 1 further comprising the step of:
   turning a second disk through said feeding station, said second disk turning intermittently about an axis and functioning and appearing generally the same as said first disk while being located generally parallel and tangential to said first disk, said first and second disk being rotated and turned through said feeding station prior to said carrying step, and
   wherein in said transferring step there is a third disk lying generally parallel to said first disk and said second disk and defining around its periphery a plurality of holes for receiving said objects carried in the openings of said first and second disks, said third disk rotating intermittently about an axis such that at all times one of said holes on said third disk is superposed over one of said openings of said first disk and a second of said holes of said third disk is superposed over one of said holes of said second disk, said transferring step comprising transferring said objects from each of said openings in said first and second disks to alternating holes in said third disk such that the object transferred from said first disk to said third disk lies in a hole in said third disk that is between two holes holding one object each from said second disk.

* * * * *